April 1, 1958
R. L. HACKMAN
2,829,238
ELECTRIC ARC PROJECTION WELDING
Filed July 24, 1956
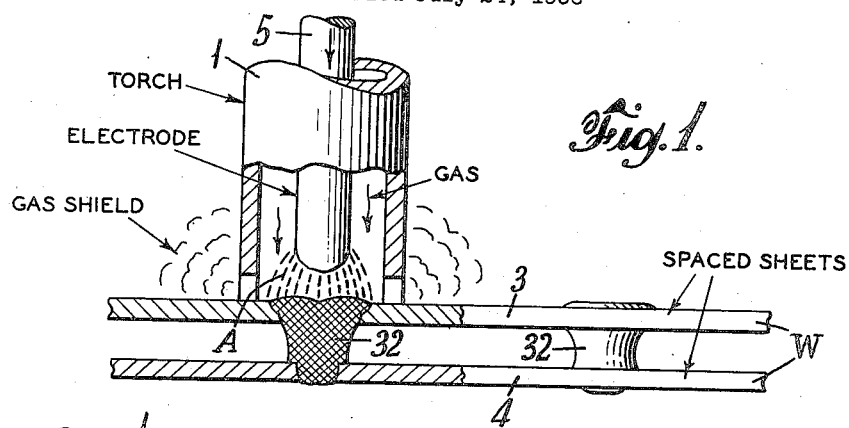
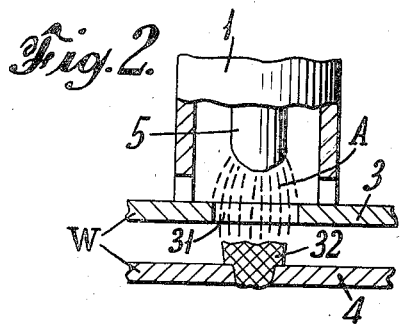
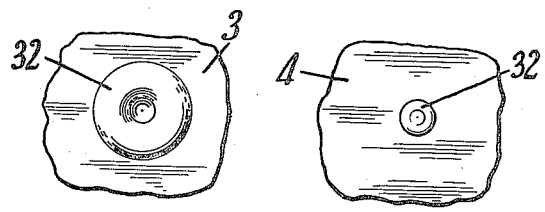
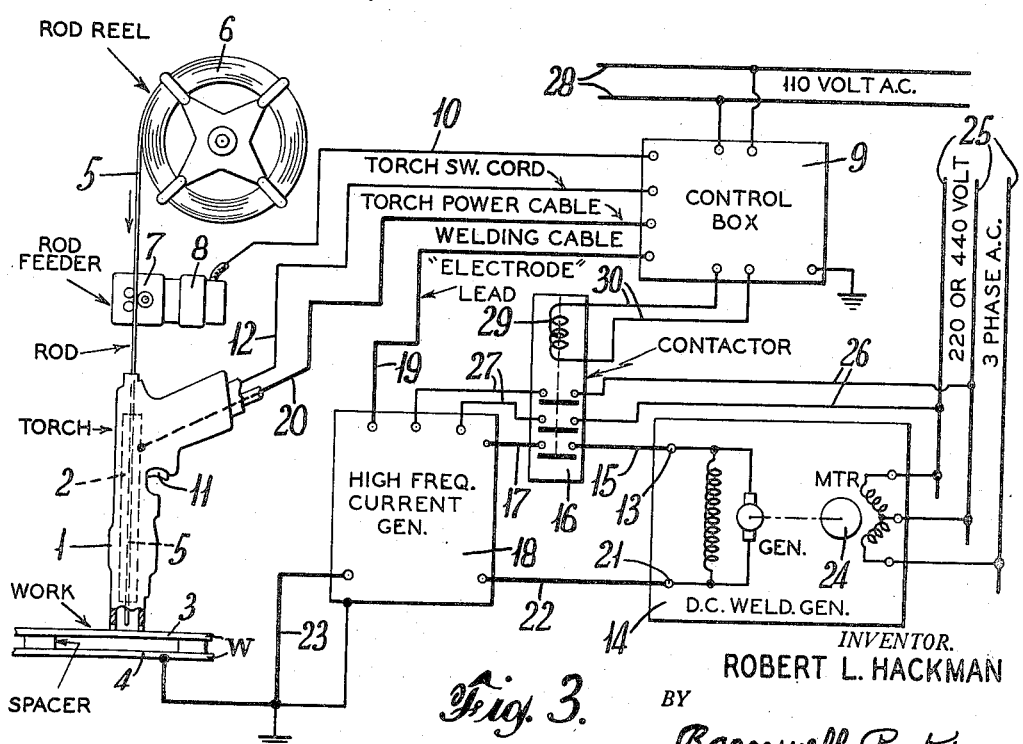
INVENTOR.
ROBERT L. HACKMAN
BY
Barnwell R. King
ATTORNEY

United States Patent Office 2,829,238
Patented Apr. 1, 1958

2,829,238
ELECTRIC ARC PROJECTION WELDING

Robert L. Hackman, Morris Plains, N. J., assignor to Union Carbide Corporation, a corporation of New York Application July 24, 1956, Serial No. 599,758

4 Claims. (Cl. 219—127)

This invention relates to electric arc welding, and more particularly to a novel method of fabricating spaced-apart workpieces.

According to the invention there is provided an improved method of projection welding which consists of spacing two sheets or plates of metal, using sigma (shielded-inert-gas metal-arc) spot-welding equipment to melt a hole through the upper of such spaced sheets or plates so that the arc fuses the lower one, builds up a column of metal, fuses it into the upper one, and fills up the hole originally melted therein. With this method, it is possible to obtain a large fused area in the lower plate with no preparation of the material to be welded other than the insertion of spacers between the two pieces of metal, provided both of the latter are in circuit with the arc.

Prior to the present invention difficulty was encountered in obtaining sufficient bursting strength on sigma spot welded type 304 stainless steel cold-wall dimple sheets for refrigerated milk tanks. Projection welding of the two known types, i. e., welding through solid material, and welding in plugged material, failed to produce the required bursting strength. As a solution to this type of problem, the subject method of projection welding of spaced parts requires no preparation other than that they be held in the desired spaced-apart relation during the operation.

In the drawing:

Fig. 1 is a fragmentary elevational view, with parts shown in cross section, of a set-up illustrating the invention;

Fig. 2 is a similar view of a weld in the process of being formed;

Fig. 3 is a diagram of a typical circuit arrangement for carrying out the invention; and Figs. 4 and 5 are top and bottom views of a weld made according to the invention.

As shown, a sigma welding torch 1 having a rod contact tube 2 is positioned with the nozzle thereof on the work W that is composed of spaced sheets 3 and 4 of the metal parts to be fabricated. A rod 5 in the form of wire is drawn from a reel 6 by a rod feeder 7 which feeds such rod through the tube 2 in the torch 1, toward the work W. The rod feeder 7 is driven by a motor 8 that is connected to a control box 9 by a cable 10. The torch is provided with a switch 11 that is electrically connected to such box through a cord 12.

Welding current is supplied to tube 2 in the torch from terminal 13 of a direct current welding generator 14 by way of a lead 15, contactor 16, lead 17, high frequency generator 18, electrode lead 19, control box 9, and a torch power cable 20. Welding current is supplied to the work W, from terminal 21 of generator 14 by way of lead 22, high frequency generator 18, and a ground lead 23. Spacing of the parts 3 and 4 can be accomplished by any suitable means provided that electrical contact is maintained therebetween.

The welding generator is driven by a motor 24 that is connected to three-phase power lines 25. The input of the high frequency generator 18 is also energized by a phase of such power lines through leads 26, contactor 16, and leads 27. Control current is supplied to control box 9 from 110 volt alternating current supply lines 28; and the relay coil 29 of contactor 16 is connected to the control box by conductors 30. Control box 9 contains a timer in accordance with known sigma spot welding practice, and the illustrated equipment is well known to those skilled in the art.

As pointed out above, according to this invention, the improved method of projection welding consists of using such sigma spot-welding equipment to melt a hole 31, Fig. 2, through the top sheet 3 so that the arc A which is drawn between the work W and rod 5 fuses the lower sheet 4 and a column 32 of metal is built up until it fuses into the top sheet and fills up the hole originally burned in such top sheet, as shown in Fig. 1. With this method, it is possible to obtain a large fused area in the lower sheet with no preparation of the material to be welded other than the insertion of spacers between the parts to be welded. During the operation the fusible metal rod 5 is fed at a speed of at least 160 I. P. M.

This new method of "space-welding" has been used successfully to fabricate stainless steel sheets in thicknesses up to ⅛-in. and with gaps or spaces therebetween up to twice the thickness of the bottom sheet. The resultant assembly has high rigidity and strength.

Two sheets of 1/16-in. carbon steel have been "space-welded" together according to the invention under the following welding conditions: 280 amps., double cycle, 2.2 seconds on —16 seconds off, 27 volts. It required 412 lbs. to produce ½-in. of deflection on such welded assembly as compared to 212 lbs. to produce the same amount of deflection on a ⅛-in. carbon steel sheet.

This "space-welding" method of projection welding can be used to advantage in many other applications similar to cold walls and, also, wherever light-weight walls and decking of high rigidity and strength are required, i. e., the aircraft industry, in the production of supersonic aircraft or missiles where a coolant is circulated between double skins of metal.

Work using this process has also been accomplished where corrosion problems made the conventional lap welding of carbon steel and mild steel tanks unsatisfactory. The following table shows the types of welds that were made and the welding conditions. The spacing of the metal parts using the new "space-welding" method permits the spraying or washing of the resultant tanks with corrosion-resistant materials.

| Conditions | Weld No. 1 | Weld No. 2 | Weld No. 3 | Weld No. 4 |
|---|---|---|---|---|
| Type of steel | Carbon | Carbon | Mild | Mild |
| Plate thickness in | 0.03 | 0.04 | 0.0622 | 0.095 |
| Gap between plates in | 0.03 | 0.04 | 0.0622 | 0.095 |
| Wire size | 3/64 | 3/64 | 1/16 | 1/16 |
| Cup size | 12 | 16 | 16 | 16 |
| Flow rate C. F. H. | 20 | | | |
| Wire used/weld in | 3 | 5.5 | 7 | 10 |
| Amperes | 180 | 280 | 280 | 300 |
| Volts | 28 | 24 | 25 | 27 |
| Arc time sec | 0.8 | 1.0 | 1.5 | 2.5 |

The above welds were made "downhand" with an arc shielding gas composed of 95% argon and 5% oxygen, flowing through the cup at a rate of about 20 C. F. H. The power source was a constant potential A. C.-D. C. rectifier connected so that the electrode was positive and the work negative, i. e., at reverse polarity. Cup sizes #12 and #16 are ¾ in. and one inch in internal diameter.

Some applications of the "space-welding" method of the present invention require single-cycle sigma spot weld; while others, particularly as the spacing increases above about 1/8", require double cycle sigma spot welding, i. e., stopping the electrode feed momentarily after a hole has been pierced in the upper part. The nuggets or spacers which are developed between the sheets are very uniform and indicate that good fusion is obtained into the lower plate. However, the fusion into the lower plate is not necessarily equal to the diameter of the nugget at that point. Some cold lap may occur. By putting an additional spot weld through the lower plate from the opposite side, most of the cold-lap area can be eliminated. In effect, this places a sigma spot weld button on each side of the assembly being joined.

The invention can be used effectively on any material that can be sigma welded, with the possible exception of aluminum. Although the illustrated equipment includes a high frequency generator, the latter is not essential in carrying out the invention.

What is claimed is:

1. Process of fabricating spaced-apart sheets or plates of metal which comprises piercing a hole in one of said sheets or plates with a sigma welding torch directed from the outside toward the inside of said sheets or plates, which are in circuit relation with the arc, and by operating through such hole fusing adjacent metal of the other sheet or plate and building up a nugget of metal on the inside of such other sheet or plate, which nugget is thereby fusion welded to both of said sheets or plates, and provides a rigid bridge therebetween which fabricates the parts into an integral structure.

2. Process of fabricating as defined by claim 1, in which said nugget is additionally spot welded to said other sheet with a welding torch directed from the outside thereof opposite said one sheet or plate for the purpose of eliminating cold-lap therein.

3. Process of projection welding metal parts which comprises securing the parts to be welded in spaced relation, connecting such parts in circuit relation with sigma welding equipment which is used to pierce a hole in one of such parts, fuse adjacent metal of the other part and then build up a nugget of metal on the inside of such other part until such nugget fills such hole and integrally unites both parts, such nugget being thereby fusion welded to such other part.

4. Process of projection welding as defined by claim 3, in which the fusible metal electrode of such equipment is fed at a speed of at least 160 I. P. M. during the operation.

References Cited in the file of this patent

UNITED STATES PATENTS

| | | |
|---|---|---|
| 1,615,686 | Eschholz | Jan. 25, 1927 |
| 2,504,868 | Muller et al. | Apr. 18, 1950 |